United States Patent
Ide et al.

(10) Patent No.: US 8,744,612 B2
(45) Date of Patent: Jun. 3, 2014

(54) NUMERICAL CONTROLLER FOR MACHINE TOOL WITH FUNCTION OF CONTROLLING SPEED OF ARC OPERATION

(75) Inventors: Soichiro Ide, Minamitsuru-gun (JP); Michiharu Kawahara, Minamitsuru-gun (JP); Takenori Ono, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/097,858

(22) Filed: Apr. 29, 2011

(65) Prior Publication Data
US 2012/0010745 A1    Jan. 12, 2012

(30) Foreign Application Priority Data
Jul. 12, 2010  (JP) .................................. 2010-157938

(51) Int. Cl.
G06F 19/00 (2011.01)
G05B 19/416 (2006.01)
G05B 19/25 (2006.01)

(52) U.S. Cl.
USPC ........................ 700/188; 318/568.18; 318/571

(58) Field of Classification Search
USPC ........... 700/13, 28, 32–34, 46, 54, 55, 67–71, 700/173–175, 177, 186–189, 193; 318/560, 318/567, 568.1, 568.15, 568.18, 569–574
See application file for complete search history.

(56) References Cited

U.S. PATENT DOCUMENTS

| | | | | |
|---|---|---|---|---|
| 3,866,179 A | * | 2/1975 | McGee et al. ..................... 700/9 |
| 4,543,625 A | * | 9/1985 | Nozawa et al. ............... 700/174 |
| 5,216,344 A | * | 6/1993 | Sasaki et al. .................. 318/573 |
| 5,444,636 A | * | 8/1995 | Yoshida et al. ............... 700/188 |
| 5,723,961 A | * | 3/1998 | Fujino et al. ............. 318/568.15 |
| 5,765,976 A | * | 6/1998 | Ozaki et al. ................... 409/293 |
| 5,770,830 A | * | 6/1998 | Chuang et al. ............. 219/69.12 |
| 5,825,654 A | | 10/1998 | Speth et al. |
| 5,994,863 A | * | 11/1999 | Fujita ....................... 318/568.15 |
| 6,597,968 B2 | * | 7/2003 | Matsumoto et al. .......... 700/188 |
| 6,748,300 B2 | | 6/2004 | Sato ............................... 700/304 |
| 6,943,522 B2 | * | 9/2005 | Nagaoka et al. .............. 318/632 |
| 6,999,845 B2 | * | 2/2006 | Hirai et al. .................... 700/189 |
| 7,070,368 B2 | * | 7/2006 | Murakami et al. ............. 409/84 |
| 7,072,734 B2 | * | 7/2006 | Suzuki et al. ................. 700/189 |
| RE39,907 E | * | 11/2007 | Hong ............................ 318/571 |
| 7,449,857 B2 | * | 11/2008 | Ohta et al. .................... 318/560 |
| 7,792,604 B2 | * | 9/2010 | Hong et al. ................... 700/188 |

(Continued)

FOREIGN PATENT DOCUMENTS

CN    1621986 A    6/2005
DE    198 11 049 A1    10/1998

(Continued)

*Primary Examiner* — M. N. Von Buhr
(74) *Attorney, Agent, or Firm* — Drinker Biddle & Reath LLP (57) ABSTRACT

A numerical controller for machine tools that has function of controlling the speed of arc operation calculates a first operable feedrate based on the arc radius of a machining path and the allowable frequency (or allowable angular speed) to which servo position control is capable of responding. The numerical controller also calculates a second operable feedrate based on the arc radius of the machining path and the allowable acceleration to which servo position control can respond, and selects the minimum feedrate from the commanded feedrate and the calculated first and second feedrate to perform speed control.

4 Claims, 7 Drawing Sheets

(56) References Cited

U.S. PATENT DOCUMENTS

| | | | |
|---|---|---|---|
| 7,969,113 B2 * | 6/2011 | Ide | 318/611 |
| 8,024,068 B2 * | 9/2011 | Gray | 700/252 |
| 2001/0012972 A1 * | 8/2001 | Matsumoto et al. | 700/160 |
| 2001/0024098 A1 | 9/2001 | Takahashi et al. | |
| 2002/0084763 A1 * | 7/2002 | Shibukawa et al. | 318/569 |
| 2003/0192867 A1 * | 10/2003 | Yamazaki et al. | 219/121.78 |
| 2005/0119784 A1 | 6/2005 | Suzuki et al. | |

FOREIGN PATENT DOCUMENTS

| | | | | |
|---|---|---|---|---|
| DE | 101 11 476 A1 | | 9/2001 | |
| JP | 63-303402 | | 12/1988 | |
| JP | 05061529 A | * | 3/1993 | ........... G05B 19/407 |
| JP | 08137536 A | * | 5/1996 | ........... G05B 19/416 |
| JP | 2000237931 A | * | 9/2000 | ............ B23Q 15/08 |
| JP | 2003-334740 | | 11/2003 | |
| JP | 2003330517 A | * | 11/2003 | ........... G05B 19/416 |
| WO | WO 96/10221 A1 | | 4/1996 | |

* cited by examiner

NUMERICAL CONTROLLER FOR MACHINE TOOL WITH FUNCTION OF CONTROLLING SPEED OF ARC OPERATION

RELATED APPLICATION DATA

This application claims priority under 35 U.S.C. §119 and/or §365 to Japanese Application No. 2010-157938 filed Jul. 12, 2010, the entire contents of which is incorporated herein by reference.

BACKGROUND OF THE INVENTION

1. Field of the Invention

The present invention relates to a numerical controller for machine tools, and more particularly to a numerical controller for machine tools that controls a speed in the tangential direction in arc operation by using an arbitrarily set or commended frequency or angular speed.

2. Description of the Related Art

In a numerical controller for machine tools, speed control in an arc-shaped machining path is performed so that the acceleration caused by changes in the movement direction of an axis is equal to or less than an arbitrarily set or specified acceleration. Even when the same acceleration is set, however, the frequency to be commanded for a servo system increases as the arc radius becomes smaller or the commanded speed becomes larger. As a result, the servo system may become unstable when the response cycle of position control is exceeded. A general measure against this case is to stop the operation of the control axis by an alarm that is issued by the servo or numerical control. If the axial operation stops during machining, however, the workpiece may be damaged or it takes long time until the machining is resumed.

An allowable acceleration is arbitrarily preset or specified within the range of machining that is actually performed, so that speed control is performed not to saturate the specified speed value or specified torque command value. In speed control only by the allowable acceleration, however, a problem arises that the feedrate cannot be clamped sufficiently during machining of a minute arc or an attempt to sufficiently clamp the feedrate increases machining time considerably.

Japanese Patent Application Laid-Open No. 2003-334740 discloses a technique in which a speed command for each time is generated on the basis of a specified route and specified speed, the frequency band components corresponding to machine vibration included in the generated speed command for each time are calculated to obtain the frequency components corresponding to the machine vibration, thereby obtaining an allowable speed that allows the obtained frequency components to be equal to or less than a reference value.

Japanese Patent Application Laid-Open No. 63-303402 discloses a technique for correcting a speed command for an arc path using the target value of an angular speed value about the arc center. This technique is speed control that corrects an arc route and reduces the path difference between the specified path and the response path by feed forward control.

Japanese Patent Application Laid-Open No. 2003-334740 and Japanese Patent Application Laid-Open No. 63-303402 do not relate to speed clamping for machining shapes by interpolation of an arc with a small radius.

SUMMARY OF THE INVENTION

The object of the present invention is, in view of the above problems of the prior art, to provide a numerical controller for machine tools that is capable of continuously machining a workpiece without saturating the specified speed value or specified torque value of a servo by clamping the speed (feedrate) in the tangential direction of a curved line of a curved surface using a frequency or angular speed to which the position control of the servo can respond during machining of the curved surface by arc interpolation or contiguous minute line segment blocks.

A first aspect of a numerical controller for machine tools according to the present invention performs arc interpolation according to an arc radius and a feedrate commanded by a machining program, and comprises means for calculating a first allowable feedrate based on a frequency or an angular speed that is set in advance or specified by the machining program and to which servo position control is capable of responding, comparison means for comparing the commanded feedrate with the calculated first allowable feedrate, and control means for performing speed control using the first allowable feedrate as the feedrate if the comparison means determined that the commanded feedrate is equal to or greater than the first allowable feedrate.

The numerical controller may further comprise means for calculating a second allowable feedrate based on the commanded arc radius and an allowable acceleration set in advance, wherein the comparison means may compare the commanded feedrate with the second allowable feedrate, in addition to comparing the commanded feedrate with the first allowable feedrate, and the control means may extract a smallest feedrate from a plurality of feedrate compared by the comparison means and performs speed control using the extracted feedrate.

A second aspect of a numerical controller for machine tools according to the present invention performs machining by looking ahead a machining block having contiguous command blocks, and comprises means for calculating a curvature radius of a block in execution based on the block and blocks before and/or after the block, means for calculating a first allowable feedrate based on a preset or commanded frequency or an angular speed to which servo position control is capable of responding and the calculated curvature radius, comparison means for comparing the feedrate commanded in the command block with the calculated first allowable feedrate, and control means for performing speed control using the first allowable feedrate as the feedrate if the comparison means determined that the first allowable feedrate is less than the commanded feedrate.

The numerical controller may further comprise means for calculating a second allowable feedrate based on the calculated curvature radius of the block and an allowable acceleration set in advance, wherein the comparison means may compare the commanded feedrate with the second allowable feedrate, in addition to comparing the commanded feedrate with the first allowable feedrate, and the control means may extract a smallest feedrate from a plurality of feedrate compared by the comparison means and performs speed control using the extracted feedrate.

According to a numerical controller for machine tools of the present invention, the speed in the tangential direction of a curved line is clamped by a frequency or angular speed to which servo position control is capable of responding during machining of the curved surface by arc interpolation or contiguous minute line segment blocks, so the workpiece can be continuously machined without the specified speed value and specified torque value of the servo being saturated.

BRIEF DESCRIPTION OF THE DRAWINGS

These and other objects and features of the present invention will become apparent from the following description of exemplary embodiments with reference to the accompanying drawings in which.

DETAILED DESCRIPTION OF THE PREFERRED EMBODIMENTS

A numerical controller according to the present invention performs speed control by an allowable acceleration, and also by a frequency (or angular speed) allowed by a servo, during machining of an arc.

An operable feedrate is automatically calculated on the basis of an allowable frequency (or preset allowable angular speed) to which servo position control is capable of responding, set in advance or commanded during the execution of a machine program, and the arc radius (or curvature radius) of a machining path. If the commanded feedrate is larger than the calculated operable feedrate, clamping is performed by the calculated operable feedrate. In addition, if speed control by an allowable acceleration is enabled at the same time, the minimum feedrate is automatically determined from the commanded feedrate, the calculated operable feedrate, and the feedrate calculated under speed control by an allowable acceleration to perform clamping of the feedrate.

In an arc interpolation, the radius of the arc and the feedrate, prepared in advance, are output during commanding of the interpolation. An allowable frequency (or angular speed) to which servo position control can respond is set or commanded to calculate the allowable feedrate based on the arc radius and the allowable frequency (or allowable angular speed) when the interpolation command is analyzed. If the commanded feedrate is larger than the allowable feedrate which was calculated in that way, the commanded feedrate is clamped.

When the commanded feedrate is assumed to be $F_C$ mm/min and the commanded radius to be $R$ mm, the commanded frequency of the commanded arc (commanded arc frequency) $v_C$ and the commanded angular speed of the commanded arc (commanded arc angular speed) $\omega_C$ are obtained by expression (1) and expression (2), respectively.

$$v_C = \frac{1}{\frac{2\pi R}{F_C} \times 60} \quad [\text{Hz}] \tag{1}$$

$$\omega_C = \frac{1}{\frac{R}{F_C} \times 60} \quad [\text{rad/sec}] \tag{2}$$

The commanded feedrate $F_C$ is clamped by an allowable frequency $v_L$ or an allowable angular speed $\omega_L$ which does not allow the commanded arc frequency $v_C$ obtained by expression (1) or the commanded arc angular speed $\omega_C$ obtained by expression (2) to be equal to or less than the frequency or angular speed to which servo position control can respond. The speed limit (clamp speed) $F_L$ of the commanded feedrate $F_C$ is represented by the expression (3) or (4), using the allowable frequency $v_L$ or the allowable angular speed $\omega_L$, respectively.

$$F_L = 2\pi R v_L \times 60 \quad [\text{mm/min}] \tag{3}$$

$$F_L = R\omega_L \times 60 \quad [\text{mm/min}] \tag{4}$$

When the commanded feedrate $F_C$ is larger than the clamp speed $F_L$ ($F_C > F_L$), which is obtained by the above expression (3) or (4), the speed limit (clamp speed) $F_L$ is used as the feedrate.

When speed control by an acceleration during arc interpolation is used at the same time, the clamp speed $F_L$ or the feedrate obtained by speed control by the acceleration, whichever is smaller, is used as the feedrate.

In speed control by an acceleration during arc interpolation, the speed is controlled on the basis of the allowable acceleration Aclmp (mm/sec$^2$) and arc radius R (mm), as shown in expression (5).

$$F_L = \sqrt{A clmp \times R} \times 60 \quad [\text{mm/min}] \tag{5}$$

Figure 1:
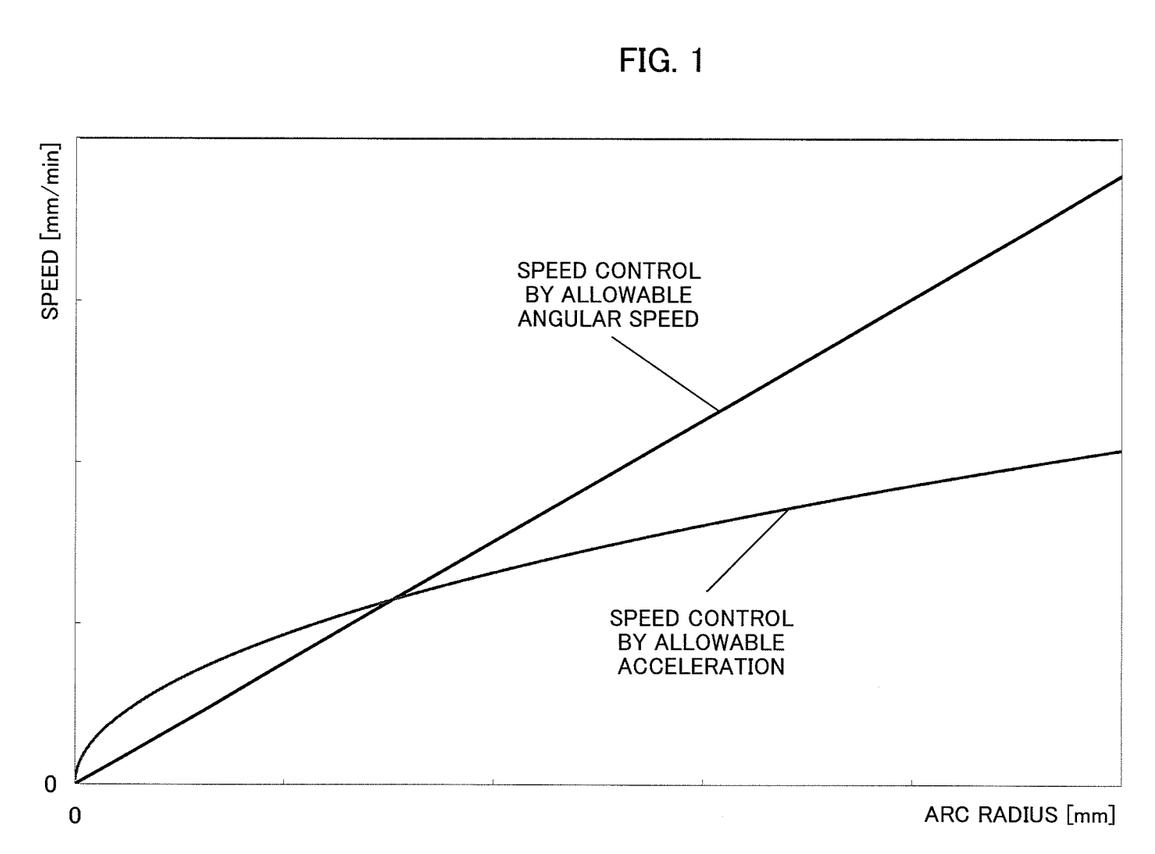
FIG. 1 is a graph showing the relationship between a clamp speed under speed control by an allowable acceleration and a clamp speed under speed control by an allowable angular speed (or allowable frequency).

FIG. 1 is a graph showing the relationship between a clamp speed under speed control by an allowable acceleration Aclmp and a clamp speed under speed control by an allowable angular speed $\omega_L$ (or allowable frequency $v_L$).

In speed control by the allowable frequency $v_L$ or the allowable angular speed $\omega_L$ of the graph in FIG. 1, the clamp speed $F_L$ is represented as a straight line proportional to the arc radius R according to the expressions (3) and (4). On the other hand, in speed control by the acceleration, the clamp speed $F_L$ is represented as the curve of the square root of the arc radius R according to the expression (5).

Embodiment 1

Here, the present invention will be described by applying specific values to the allowable angular speed $\omega_L$ and the allowable acceleration Aclmp.

It is assumed that the allowable angular speed $\omega_L$ is 63 rad/sec, the allowable acceleration Aclmp is 6000 mm/sec$^2$, speed control by the allowable angular speed $\omega_L$ and speed control by the allowable acceleration Aclmp are used together, arc interpolation of a circle with a radius of 10 mm and arc interpolation of a circle with a radius of 1 mm are performed continuously at a feedrate of 5000 mm/min by a machining program.

Figure 2:
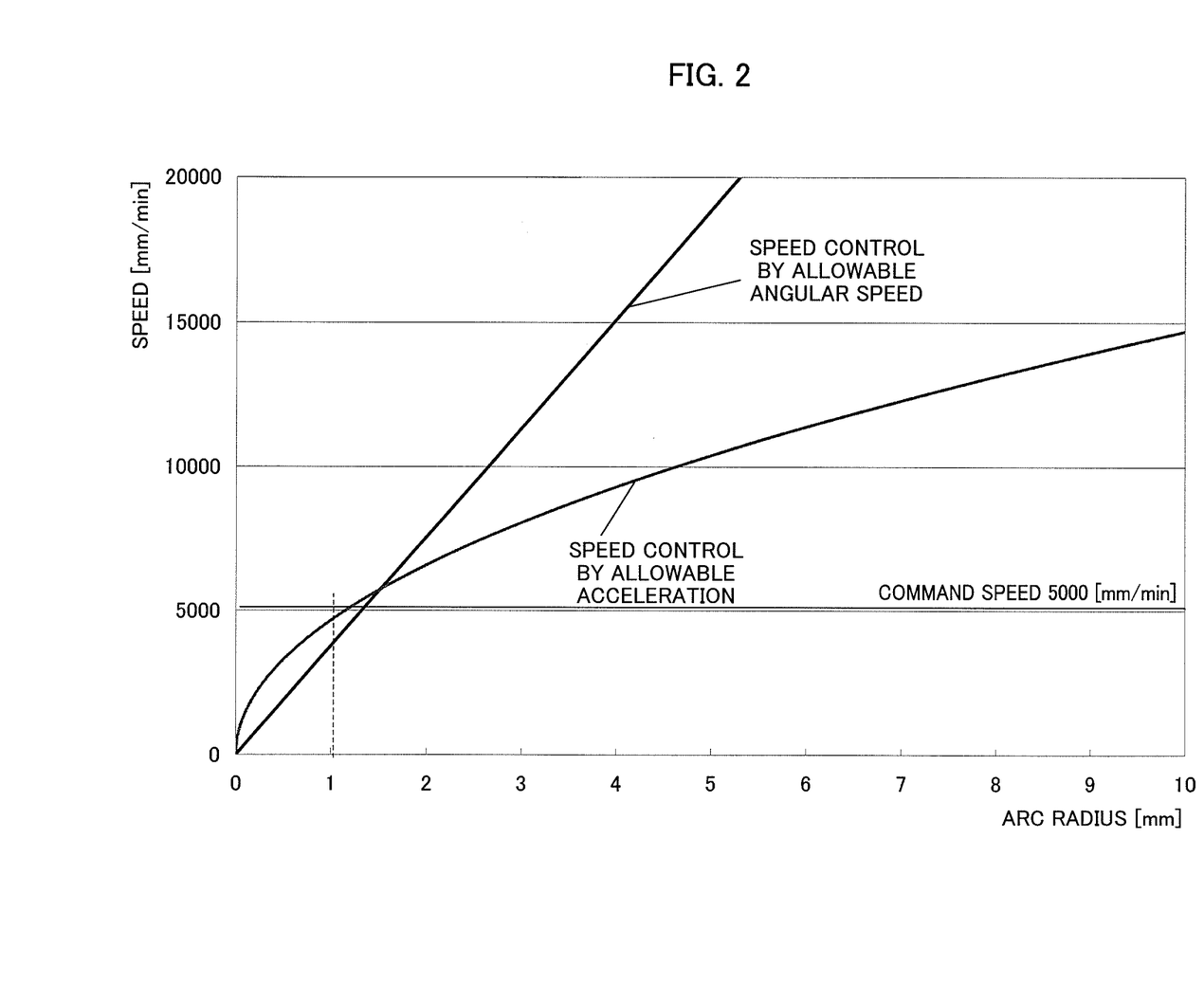
FIG. 2 is a graph showing the relationship between a clamp speed under speed control by an allowable acceleration and a clamp speed under speed control by an allowable frequency (or allowable angular speed), where the allowable angular speed is 63 rad/sec and the allowable acceleration is 6000 mm/sec$^2$.

As shown in the graph in FIG. 2, in the case of an arc having a radius of 10 mm, the commanded feedrate $F_C$ (5000 mm/min) is smaller than the speed (14697 mm/min) obtained by speed control by the allowable acceleration Aclmp, so the commanded feedrate $F_C$ (5000 mm/min) is used for machining. On the other hand, in the case of an arc having a radius of 1 mm, the speed (3780 mm/min) obtained by speed control by the allowable angular speed $\omega_L$ (63 rad/sec) is smaller than the commanded feedrate $F_C$ (5000 mm/min), so the feedrate is clamped by the speed obtained by speed control by the allowable angular speed $\omega_L$ for machining.

Where Aclmp=6000 and R=10 in the expression (5) above, the clamp speed $F_L$ obtained by speed control by the allowable acceleration Aclmp is as follows:

$F_L=\sqrt{[6000\times10]}\times60=14697$ (mm/min).

When $\omega_L=63$ and R=1 in the expression (4) above, the clamp speed $F_L$ obtained by speed control by the allowable angular speed $\omega_L$ is as follows:

$F_L=1\times63\times60=3780$ (mm/min).

Figure 3:
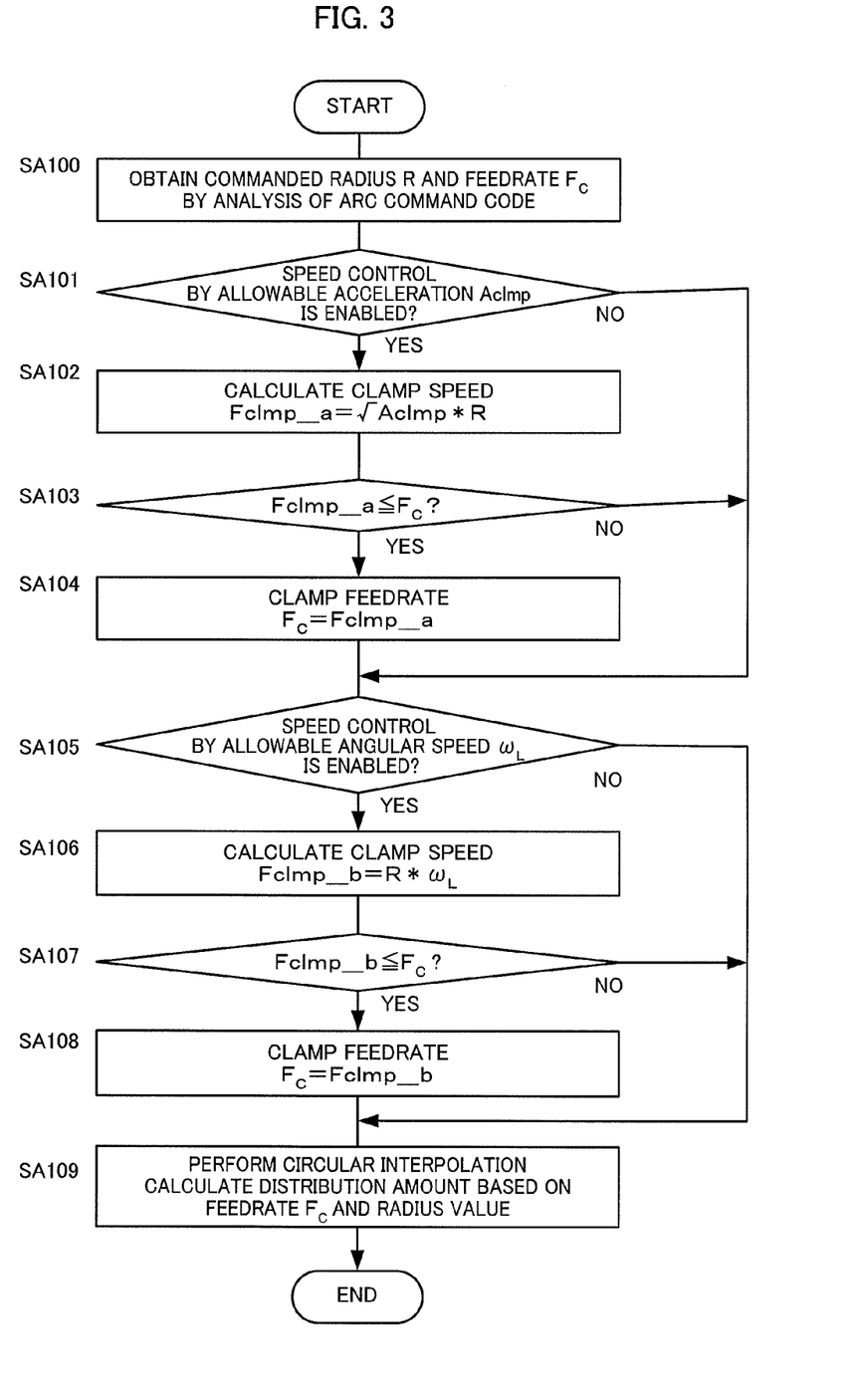
FIG. 3 is a flowchart showing an algorithm for speed control during arc interpolation.

FIG. 3 is a flowchart showing an algorithm for speed control during arc interpolation. The steps of the algorithm will be described below. In this flowchart, it is assumed that distance is represented in mm, speed is in mm/sec, acceleration is in mm/sec$^2$, and angular speed is in deg/msec.

[Step SA100] An arc command code in the machining program is analyzed to obtain the commanded radius R and the commanded feedrate $F_C$.

[Step SA101] A decision is made as to whether speed control by the allowable acceleration Aclmp is enabled or not by checking if the allowable acceleration Aclmp is set in advance or specified, and then the processing proceeds to step SA102 if it is enabled, or the processing proceeds to step SA105 if it is not enabled.

[Step SA102] An allowable acceleration Aclmp-based clamp speed Fclmp_a is calculated by the expression Fclmp_a=$\sqrt{\text{Aclmp}*R}$.

[Step SA103] A decision is made as to whether the commanded feedrate $F_C$ read in step SA100 is equal to or larger than the clamp speed Fclmp_a, and then the processing proceeds to step SA104 if it is equal to or larger, or the processing proceeds to step SA105 if it is smaller.

[Step SA104] The commanded feedrate $F_C$ is set to the allowable acceleration Aclmp-based clamp speed Fclmp_a ($F_C \leftarrow$ Fclmp_a).

[Step SA105] A decision is made as to whether speed control by the allowable angular speed $\omega_L$ is enabled or not by checking if the allowable angular speed $\omega_L$ is set in advance or specified, and then the processing proceeds to step SA106 if it is enabled, or the processing proceeds to step SA109 if it is not enabled.

[Step SA106] An allowable angular speed $\omega_L$-based clamp speed Fclmp_b is calculated by the expression FclmpA_a=R$\times\omega_L$. [Step SA107] A decision is made as to whether the commanded feedrate $F_C$ read in step SA100 is equal to or larger than the clamp speed Fclmp_b, and then the processing proceeds to step SA108 if it is equal to or larger, or the processing proceeds to step SA109 if it is smaller.

[Step SA108] The commanded feedrate $F_C$ is set to the allowable angular speed $\omega_L$-based clamp speed Fclmp_b ($F_C \leftarrow$ Fclmp_b).

[Step SA109] Arc interpolation is performed. That is, a distribution amount is calculated on the basis of the feedrate $F_C$ and the commanded radius R obtained in step SA100. Then, the processing ends.

Embodiment 2

Next, speed control by contiguous command blocks during curve machining will be described.

There is a known technique for analyzing and executing command blocks by looking ahead contiguous command blocks from a machining program to be executed by a numerical controller. This known technique looks ahead contiguous command blocks, obtains the curvature radius in a certain command block from the blocks before and/or after the certain command block, and calculates the allowable feedrate from the curvature radius and the allowable frequency $v_L$ or the allowable angular speed $\omega_L$.

If the commanded feedrate is larger than the calculated allowable feedrate, clamping is performed using the allowable feedrate, the blocks are executed at the clamped feedrate, and control is made so that operation is performed at a speed equal to or less than the clamped speed obtained on the basis of the set allowable frequency $v_L$ and the allowable angular speed $\omega_L$.

Here, the present invention will be described by applying specific values to the allowable angular speed am, and the allowable acceleration Aclmp. It is assumed that the allowable angular speed $\omega_L$ is 63 rad/sec and the allowable acceleration Aclmp is 6000 mm/sec$^2$.

Figure 4:
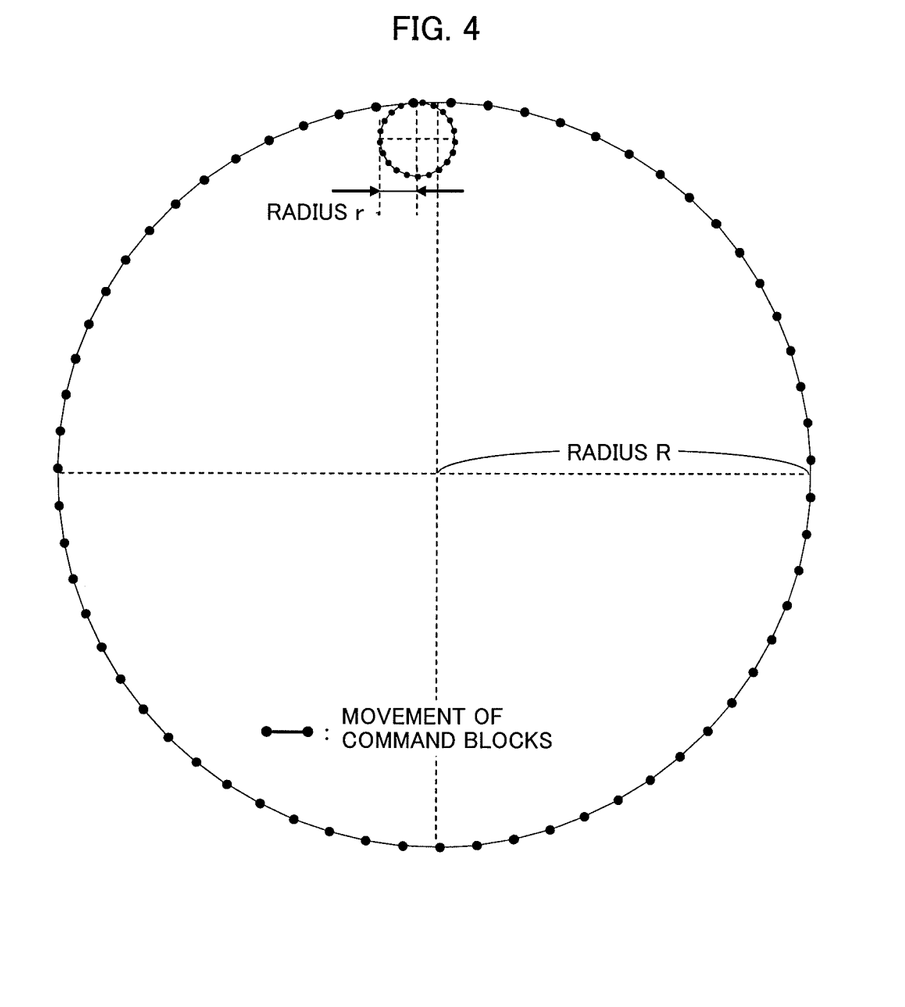
FIG. 4 exemplifies the machining path of an arc including 63 contiguous blocks (with a block length of 1 mm) of linear interpolation and the machining path of an arc including 21 contiguous blocks (with a block length of 0.3 mm) of linear interpolation.

It is also assumed that speed control by the allowable angular speed $\omega_L$ and speed control by the allowable acceleration Aclmp are used together, and a program that executes first, in a state where the numerical controller can look ahead, machining of an arc having 63 contiguous blocks (with a block length of 1 mm) of linear interpolation and then executes machining of an arc having 21 contiguous blocks (with a block length of 0.3 mm) of linear interpolation included in the machining path shown in FIG. 4, is executed at the feedrate of 5000 mm/min.

Figure 5A:
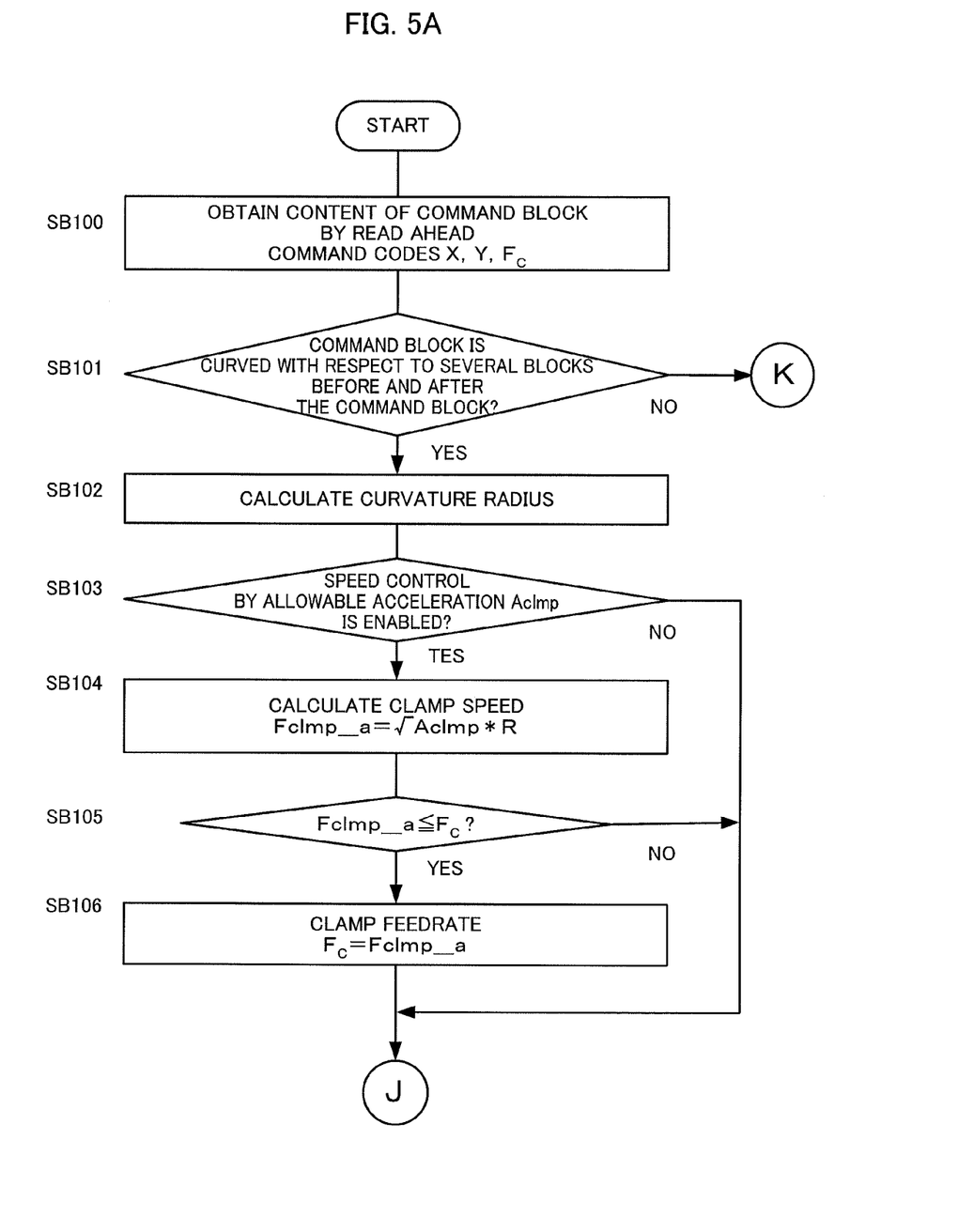
FIGS. 5A and 5B describe an algorithm for speed control by contiguous command blocks.
Figure 5B:
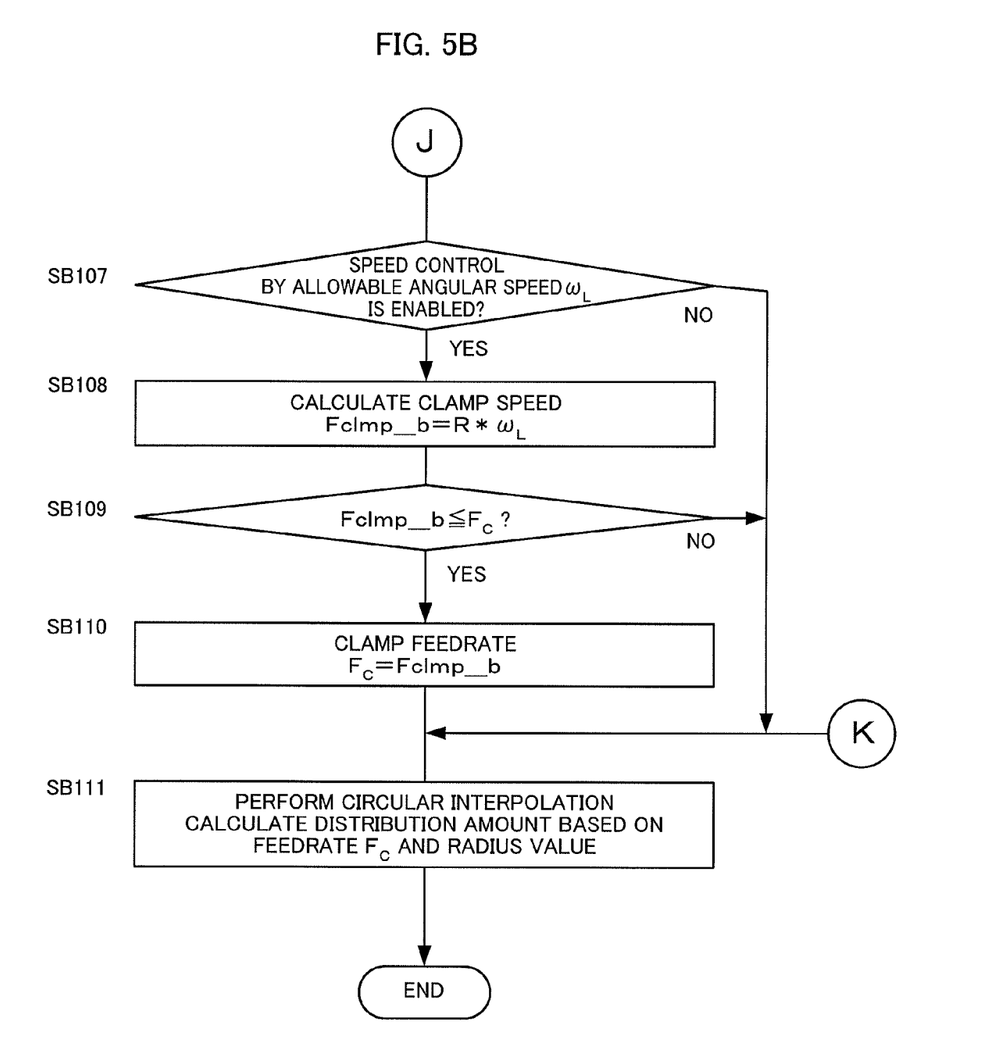

As shown in the procedure of the flowchart in FIGS. 5A and 5B, contiguous command blocks are looked ahead from the machining program to obtain the information of a certain command block from the information of the command blocks before and after the certain block. Speed control by the allowable acceleration Aclmp and speed control by the allowable angular speed $\omega_L$ are performed on the basis of the curvature radius between blocks to determine the feedrate.

In the arc including 63 blocks with a block length of 1 mm, the curvature radius R of each block becomes approximately 10 mm based on the block length and the angle θr (360 degrees÷63=5.714 degrees) between blocks.

Similarly, in the arc including 21 blocks with a block length of 0.3 mm, the curvature radius r of each block is approximately 1 mm based on the block length and the angle θr (360 degrees÷21=17.143 degrees) between blocks.

Based on the obtained curvature radiuses R and r, as in embodiment 1, the feedrate during execution of the 63 blocks with a block length of 1 mm is clamped to 5000 mm/min, which is the same as the feedrate commanded by the machining program. The feedrate during execution of the 21 blocks with a block length of 0.3 mm is clamped to 3770 mm/min, which is the speed limit (clamped speed) obtained based on speed control by the allowable angular speed $\omega_L$.

FIGS. 5A and 5B describe an algorithm for speed control by contiguous command blocks. In this flowchart, it should be noted that distance is represented in mm, speed is represented in mm/sec, acceleration is represented in mm/sec$^2$, and angular speed is represented in deg/msec.

[Step SB100] Blocks in the machining program are looked ahead to obtain command codes for two axes X, Y and the commanded feedrate $F_C$, which are contained in the command block.

[Step SB101] A decision is made as to whether or not the command block read in step SB100 is curved with respect to several blocks before and after the command block, and then the processing proceeds to step SB102 if it is curved, or the processing proceeds to step SB111 if it is not curved.

[Step SB102] The curvature radius R of the curve formed by the command block read in step SB100 and the command blocks before and after the read command block is calculated.

[Step SB103] A decision is made as to whether speed control by the allowable acceleration Aclmp is enabled or not by checking if the allowable acceleration Aclmp is set in advance, and then the processing proceeds to step SB104 if it is enabled, or the processing proceeds to step SB107 if it is not enabled.

[Step SB104] An allowable acceleration Aclmp-based clamp speed Fclmp_a is calculated by the expression Fclmp_a=$\sqrt{\text{Aclmp} \times R}$.

[Step SB105] A decision is made as to whether the commanded feedrate $F_C$ read in step SB100 is equal to or larger than the clamp speed Fclmp_a, and then the processing proceeds to step SB106 if it is equal to or larger, or the processing proceeds to step SB107 if it is smaller.

[Step SB106] The feedrate $F_C$ is set to the clamp speed Fclmp_a.

[Step SB107] A decision is made as to whether speed control by the allowable angular speed $\omega_L$ is enabled by checking if the allowable angular speed $\omega_L$ is preset, and then the processing proceeds to step SB108 if it is enabled, or the processing proceeds to step SB111 if it is not enabled.

[Step SB108] An allowable angular speed $\omega_L$-based clamp speed Fclmp_b is calculated by the expression Fclmp_b=R×$\omega_L$.

[Step SB109] A decision is made as to whether the commanded feedrate $F_C$ read in step SB100 is equal to or larger than the clamp speed Fclmp_b, the processing proceeds to step SB110 if it is equal to or larger or the processing proceeds to step SB111 if it is smaller.

[Step SB110] The feedrate $F_C$ is set to the allowable angular speed-based clamp speed Fclmp_b ($F_C$←Fclmp_b).

[Step SB111] Arc interpolation is performed. That is, a distribution amount is calculated on the basis of the feedrate $F_C$ and the commanded radius R obtained in step SB100.

Figure 6:
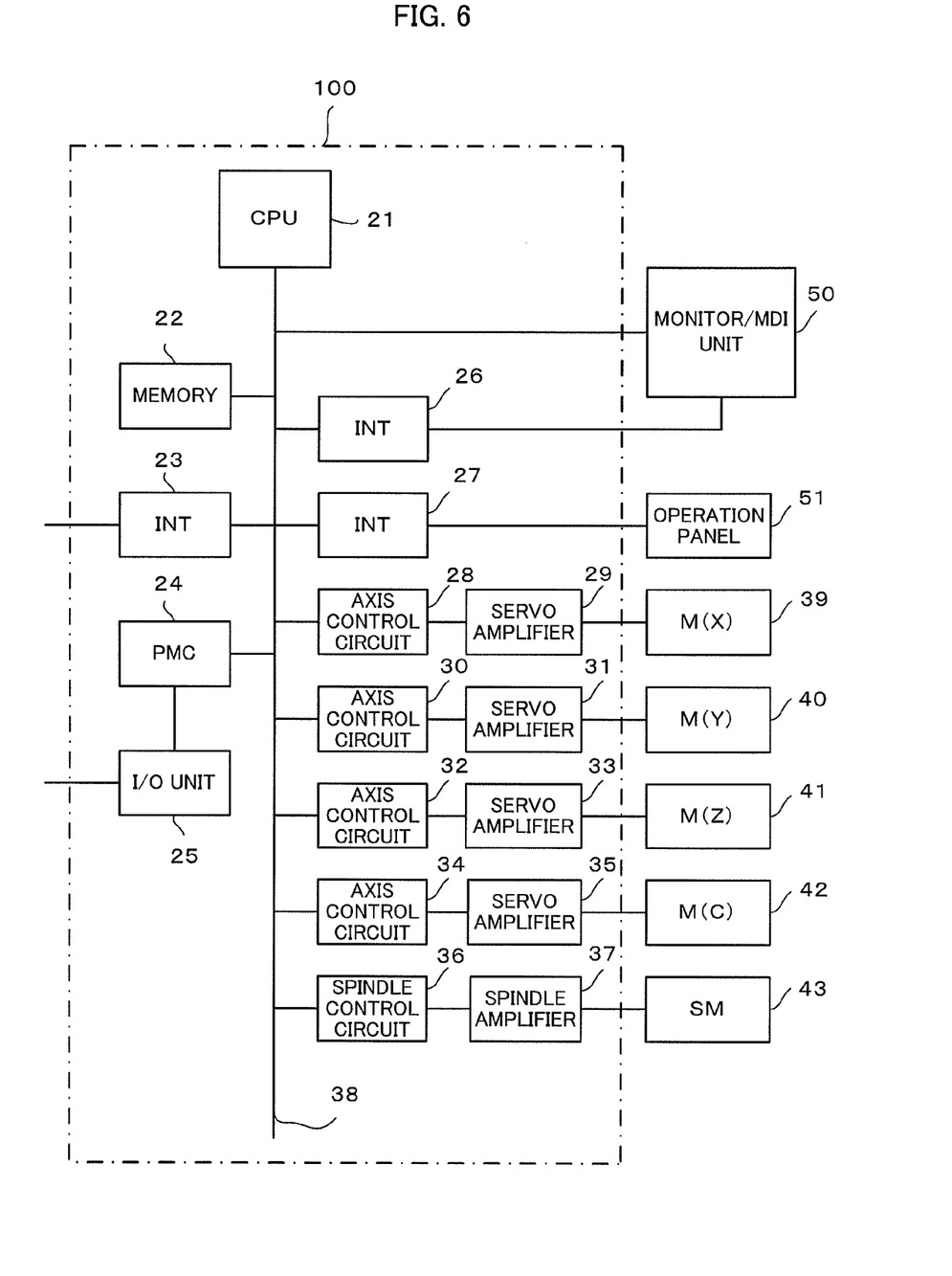
FIG. 6 is a block diagram showing a numerical controller according to an embodiment of the present invention.

FIG. 6 is a block diagram showing a numerical controller according to an embodiment of the present invention. This numerical controller has the function of looking ahead, analyzing, and executing a plurality of blocks in the machining block. The look ahead function is a known technique, so detailed description will be omitted.

A CPU 21 is a processor that totally controls a numerical controller 100 for 4-axis machine tools. The CPU 21 reads a system program stored in a ROM area of a memory 22 through a bus 38, and controls the entire numerical controller 100 according to the read system program. A RAM area of the memory 22 stores temporary calculation data, display data, and various types of data input by the operator via a display/MDI unit 50. A nonvolatile memory area including a SRAM of the memory 22 stores machining programs read through an interface 23 or machining programs etc. input through the display/MDI unit 50.

The interface 23 enables the connection between the numerical controller 100 for 4-axis machine tools and external devices (not shown). Machining programs or various parameters are read from the external devices (not shown). The machining program edited in the numerical controller 100 for 4-axis machine tools can be stored in an external storage unit via external devices. A PMC (programmable machine controller) 24 outputs a signal to an auxiliary unit of the machine tool through an I/O unit 25 by using a sequence program stored in the numerical controller 100 to perform control. The PMC 24 also receives signals from various switches and the like of an operation panel attached to the body of the machine tool, carries out necessary processing, and passes the processing results to the CPU 21.

The display/MDI unit 50 is a manual data input device having a display, keyboard, etc. An interface 26 receives commands and data from the keyboard of the display/MDI unit 50 and passes them to the CPU 21. An interface 27 is connected to an operation panel 51, which has a manual pulse generator etc.

Axis control circuits 28, 30, 32, and 34 for individual axes receive command movement amounts for the individual axes from the CPU 21 and output commands for the individual axes to servo amplifiers 29, 31, 33, and 35. The servo amplifiers 29, 31, 33, and 35 receive these commands and drive servo motors 39, 40, 41, and 42 for the individual axes (X, Y, Z, and C axes) of the 4-axis machine tool which is controlled by the numerical controller 100. The individual axes perform feedback control of positions and speeds (this structure is not shown in FIG. 6).

The servo motors 39, 40, 41, and 42 drive the X, Y, Z, and C axes of the 4-axis machine tool, respectively. A spindle control circuit 36 receives a spindle rotation command and outputs a spindle speed signal to the spindle amplifier 37. The spindle amplifier 37 receives the spindle speed signal and rotates a spindle motor 43 at a specified rotation speed.

The invention claimed is:

1. A numerical controller for machine tools that performs arc interpolation according to an arc radius and a feedrate commanded by a machining program, the numerical controller comprising:

first allowable feedrate calculating means for calculating a first allowable feedrate, which is a feedrate of an arc to which servo position control is capable of responding, using an allowable frequency, which is a frequency to which servo position control is capable of responding, or an allowable angular speed, which is an angular speed to which servo position control is capable of responding, which is set in advance or specified by the machining program, and the commanded arc radius;

comparison means for comparing the commanded feedrate with the calculated first allowable feedrate; and control means for performing speed control using the first allowable feedrate as the feedrate if the comparison means determined that the commanded feedrate is equal to or greater than the first allowable feedrate, wherein said first allowable feedrate calculating means calculates a speed $F_L$ using the following expression and sets the calculated $F_L$ as a first allowable feedrate;

$$F_L = 2\Pi R \upsilon \times 60 \text{ (mm/min) or}$$

$$F_L = R\omega \times 60 \text{ (mm/min)}$$

where R is an arc radius, $\upsilon$ is a frequency to which servo position control is capable of responding, and $\omega$ is an angular speed to which servo position control is capable of responding.

2. The numerical controller for machine tools according to claim 1, further comprising second allowable feedrate calculating means for calculating a second allowable feedrate, as the feedrate of the arc, based on the commanded arc radius and an allowable acceleration set in advance, wherein the comparison means compares the commanded feedrate with the second allowable feedrate, in addition to comparing the commanded feedrate with the first allowable feedrate, and the control means extracts a smallest feedrate from among said commanded feedrate, said first allowable feedrate and said second allowable feedrate, compared by the comparison means, and performs speed control using the extracted feedrate.

3. A numerical controller for machine tools that performs machining by looking ahead a plurality of blocks in a machining block having contiguous command blocks, the numerical controller comprising:
- means for calculating a curvature radius of a block in execution based on the block and blocks before and/or after the block;
- first allowable feedrate calculating means for calculating a first allowable feedrate, which is a feedrate of the machining block having contiguous command blocks to which servo position control is capable of responding, using an allowable frequency, which is a frequency to which servo position control is capable of responding, or an allowable angular speed, which is an angular speed to which servo position control is capable of responding, which is set or commanded in advance, and the calculated curvature radius;
- comparison means for comparing the feedrate commanded in the command block with the calculated first allowable feedrate; and
- control means for performing speed control using the first allowable feedrate as the feedrate so that it is a feedrate to which servo position control is capable of responding, if the comparison means determined that the first allowable feedrate is less than the commanded feedrate wherein said first allowable feedrate calculating means calculates a speed $F_L$ using the following expression and sets the calculated $F_L$ as a feedrate to which servo position control is capable of responding;

$$F_L = 2\Pi R \upsilon \times 60 \text{ (mm/min)} \text{ or}$$

$$F_L = R \omega \times 60 \text{ (mm/min)}$$

where R is an arc radius, $\upsilon$ is a frequency to which servo position control is capable of responding, and $\omega$ is an angular speed to which servo position control is capable of responding.

4. The numerical controller for machine tools of claim 3, further comprising second allowable feedrate calculating means for calculating a second allowable feedrate, as a feedrate of the machining block having contiguous command blocks, based on the calculated curvature radius of the block and an allowable acceleration set in advance, wherein
- the comparison means compares the commanded feedrate with the second allowable feedrate, in addition to comparing the commanded feedrate with the first allowable feedrate, and
- the control means extracts a smallest feedrate from among said commanded feedrate, said first allowable feedrate and said second allowable feedrate, compared by the comparison means, and performs speed control using the extracted feedrate.

* * * * *